United States Patent
Moon

(10) Patent No.: US 11,490,445 B2
(45) Date of Patent: Nov. 1, 2022

(54) ELECTRONIC DEVICE AND OPERATING METHOD THEREOF

(71) Applicant: SAMSUNG ELECTRONICS CO., LTD., Suwon-si (KR)

(72) Inventor: Younghoon Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/150,656

(22) Filed: Jan. 15, 2021

(65) Prior Publication Data

US 2021/0219373 A1    Jul. 15, 2021

(30) Foreign Application Priority Data

Jan. 15, 2020    (KR) .................. 10-2020-0005605

(51) Int. Cl.
| | |
|---|---|
| *H04W 76/30* | (2018.01) |
| *H04W 76/19* | (2018.01) |
| *H04W 88/06* | (2009.01) |
| *H04W 76/20* | (2018.01) |
| *H04W 4/80* | (2018.01) |
| *H04W 84/12* | (2009.01) |

(52) U.S. Cl.
CPC ............. *H04W 76/20* (2018.02); *H04W 4/80* (2018.02); *H04W 76/30* (2018.02); *H04W 84/12* (2013.01)

(58) Field of Classification Search
CPC ....... H04W 76/20; H04W 4/80; H04W 76/30; H04W 84/12; H04W 16/14; H04W 72/1215; H04W 88/06; H04W 88/10; H04W 76/19; H04W 76/14; H04W 76/15; H04W 24/04; H04W 76/34; G06F 1/24
See application file for complete search history.

(56) References Cited

U.S. PATENT DOCUMENTS

2007/0293951 A1* 12/2007 Takahashi ........... H04L 43/0817
                                                                                                                            700/1
2012/0244814 A1* 9/2012 Okayasu ............. H04M 1/6066
                                                                                                                            455/41.3

(Continued)

FOREIGN PATENT DOCUMENTS

| JP | 2018005303 A | 1/2018 |
|---|---|---|
| KR | 1020080022465 A | 3/2008 |
| KR | 1020190065786 A | 6/2019 |

OTHER PUBLICATIONS

Communication dated Jun. 14, 2021 issued by the European Patent Office in application No. 21151408.8.

(Continued)

*Primary Examiner* — Andrew Wendell
(74) *Attorney, Agent, or Firm* — Sughrue Mion, PLLC

(57) ABSTRACT

An electronic device includes a communication interface including a Bluetooth-Wireless Fidelity (WiFi) combo module; a memory storing one or more instructions; and a processor configured to execute the one or more instructions stored in the memory to: detect that a WiFi communication with an external WiFi device, which is connected through the Bluetooth-WiFi combo module, is to be recovered; and based on the detection, release a Bluetooth connection with a Bluetooth device connected through the Bluetooth-WiFi combo module, and subsequently reset the Bluetooth-WiFi combo module to recover the WiFi communication.

20 Claims, 14 Drawing Sheets

(56) References Cited

U.S. PATENT DOCUMENTS

| | | | |
|---|---|---|---|
| 2012/0315950 A1* | 12/2012 | Wang | H04B 1/0064 |
| | | | 455/552.1 |
| 2014/0228038 A1 | 8/2014 | Kella et al. | |
| 2015/0282193 A1 | 10/2015 | Kim et al. | |
| 2016/0366695 A1 | 12/2016 | Ban et al. | |
| 2018/0049257 A1* | 2/2018 | Liu | H04B 5/02 |
| 2018/0254948 A1* | 9/2018 | Li | H04W 76/27 |
| 2019/0036761 A1 | 1/2019 | Cao | |
| 2019/0150215 A1* | 5/2019 | Li | H04W 4/80 |
| | | | 370/329 |
| 2019/0222245 A1 | 7/2019 | Lim et al. | |
| 2019/0372860 A1* | 12/2019 | Kline | G06F 3/03545 |
| 2019/0384596 A1 | 12/2019 | Jeong et al. | |
| 2021/0176810 A1 | 6/2021 | Chae | |

OTHER PUBLICATIONS

International Search Report (PCT/ISA/210) and Written Opinion (PCT/ISA/237) dated Apr. 16, 2021 issued by the International Searching Authority in International Application No. PCT/KR2021/000029.

* cited by examiner

ELECTRONIC DEVICE AND OPERATING METHOD THEREOF

CROSS-REFERENCE TO RELATED APPLICATION

This application is based on and claims priority under 35 U.S.C. § 119 to Korean Patent Application No. 10-2020-0005605, filed on Jan. 15, 2020, in the Korean Intellectual Property Office, the disclosure of which is incorporated by reference herein in its entirety.

BACKGROUND

1. Field

Example embodiments relate to an electronic device and an operating method thereof, and more particularly, to an electronic device capable of reducing an influence exerted on Bluetooth communication when a Bluetooth-Wireless Fidelity (WiFi) combo module is reset, and an operating method thereof.

2. Description of Related Art

Recently, electronic devices configured to support both Bluetooth and Wireless Fidelity (WiFi) may include a Bluetooth-WiFi combo module. The Bluetooth-WiFi combo module may be a communication module configured to support Bluetooth communication and WiFi communication by using a single integrated chip (IC). However, when hardware needs to be reset due to a problem with the Bluetooth communication or the WiFi communication using the Bluetooth-WiFi combo module, both Bluetooth communication and WiFi communication may be cut off. Therefore, when an electronic device resets a Bluetooth-WiFi combo module to solve a communication problem occurring in WiFi communication, a Bluetooth connection may be unexpectedly released, and it may take a long time to establish a Bluetooth reconnection.

SUMMARY

One or more example embodiments may provide an electronic device capable of reducing an influence exerted on Bluetooth communication when a Bluetooth-Wireless Fidelity (WiFi) combo module is reset to solve a WiFi communication problem, and an operating method thereof.

Additional aspects will be set forth in part in the description which follows and, in part, will be apparent from the description, or may be learned by practice of the presented embodiments of the disclosure.

In accordance with an aspect of an example embodiment, provided is an electronic device including: a communication interface including a Bluetooth-Wireless Fidelity (WiFi) combo module; a memory storing one or more instructions; and a processor configured to execute the one or more instructions stored in the memory to: detect that a WiFi communication with an external WiFi device, which is connected through the Bluetooth-WiFi combo module, is to be recovered; based on the detection release a Bluetooth connection with a Bluetooth device connected through the Bluetooth-WiFi combo module, and subsequently reset the Bluetooth-WiFi combo module to recover the WiFi communication.

The Bluetooth-WiFi combo module may include hardware configured to support Bluetooth communication and the WiFi communication.

The processor may be further configured to execute the one or more instructions to reset the hardware configured to support the Bluetooth communication and the WiFi communication, based on the released Bluetooth connection with the Bluetooth device.

The processor may be further configured to execute the one or more instructions to: receive, based on the Bluetooth-WiFi combo module being reset, a request for the Bluetooth connection from the Bluetooth device; and establish a Bluetooth reconnection with the Bluetooth device based on the request.

The processor may be further configured to execute the one or more instructions to release the Bluetooth connection with the Bluetooth device based on whether Bluetooth data is received from the Bluetooth device.

The processor may be further configured to execute the one or more instructions to: determine whether new Bluetooth data is received from the Bluetooth device within a certain time period from a time point when most recent Bluetooth data is received from the Bluetooth device; and release the Bluetooth connection with the Bluetooth device based on a determination that the new Bluetooth data is not received from the Bluetooth device within the certain time period.

The processor may be further configured to execute the one or more instructions to output a notification message indicating that a use of the Bluetooth device may be limited to recover the WiFi communication.

The processor may be further configured to execute the one or more instructions to identify the Bluetooth device connected through Bluetooth communication, and wherein the notification message includes identification information of the identified Bluetooth device.

The notification message may include information about a time during which the use of the Bluetooth device may be limited.

The Bluetooth device may include at least one of a remote control, a keyboard, a mouse, a speaker, an earphone, or a headphone.

In accordance with an aspect of an example embodiment, provided is a method of operating an electronic device, the method including: detecting that an external Wireless Fidelity (WiFi) communication with a WiFi device, which is connected through a Bluetooth-WiFi combo module, is to be recovered; and based on the detection, releasing a Bluetooth connection with a Bluetooth device connected through the Bluetooth-WiFi combo module, and subsequently resetting the Bluetooth-WiFi combo module to recover the WiFi communication.

The Bluetooth-WiFi combo module may include hardware configured to support Bluetooth communication and the WiFi communication.

The resetting may include resetting the hardware configured to support the Bluetooth communication and the WiFi communication, based on the released Bluetooth connection.

The method may further include receiving, based on the Bluetooth-WiFi combo module being reset, a request for the Bluetooth connection from the Bluetooth device; and establishing a Bluetooth reconnection with the Bluetooth device based on the request.

The releasing may include releasing the Bluetooth connection with the Bluetooth device based on whether Bluetooth data is received from the Bluetooth device.

The method may further include determining whether new Bluetooth data is received from the Bluetooth device within a certain time period from a time point when most recent Bluetooth data is received from the Bluetooth device, wherein the releasing the Bluetooth connection with the Bluetooth device includes releasing the Bluetooth connection with the Bluetooth device based on a determination that the new Bluetooth data is not received from the Bluetooth device within the certain time period.

The method may further include outputting a notification message indicating that a use of the Bluetooth device may be limited to recover the WiFi communication.

The method may further include identifying the Bluetooth device connected through Bluetooth communication, wherein the notification message includes identification information of the identified Bluetooth device.

The notification message may include information about a time during which the use of the Bluetooth device may be limited.

In accordance with an aspect of an example embodiment, provided is a non-transitory computer-readable recording medium having stored therein a program executable by at least one processor to perform the above described method.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
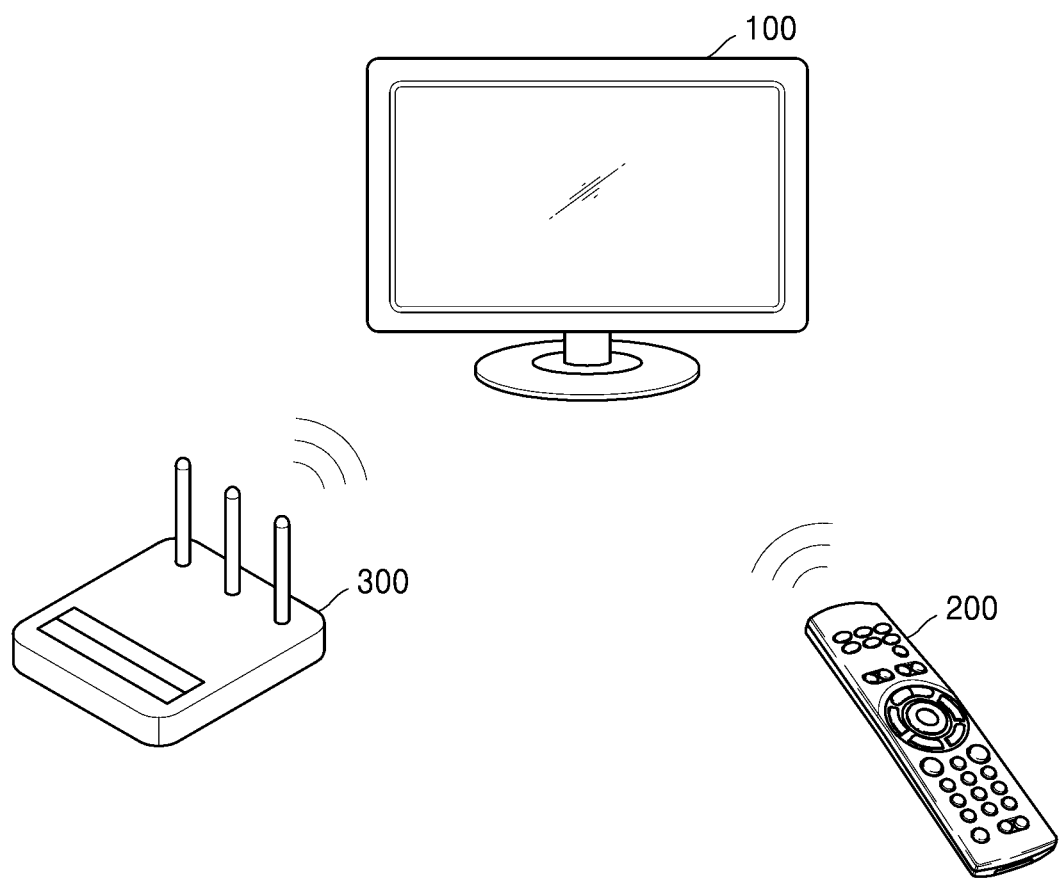
FIG. 1 illustrates a situation in which an electronic device is connected to a Bluetooth device and a Wireless Fidelity (WiFi) device.

The terms used in the specification will be schematically described, and then, the disclosure will be described in detail.

The terms used in the disclosure are those general terms currently widely used in the art while considering the functions of the disclosure, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the disclosure should be defined not as simple names but based on the meaning of the terms and the overall description.

Throughout the specification, when a certain part "includes" a certain component, this indicates that the part may further include another component instead of excluding another component unless there is different disclosure. In addition, terms such as ". . . unit" and ". . . module" used in the specification refer to units that perform at least one function or operation, and the units may be implemented as hardware or software or as a combination of hardware and software.

In the embodiments of the specification, the term "user" indicates a viewer who watches a video displayed on an electronic device or a person who controls a function or an operation of the electronic device and may include a manager or an installation engineer.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings so that those of ordinary skill in the art to which the disclosure belongs may easily realize the disclosure. However, the disclosure may be embodied in many different forms and should not be construed as being limited to the embodiments of the disclosure set forth herein. In the drawings, parts irrelevant to the description are omitted to clearly describe the disclosure, and like reference numerals denote like elements throughout the specification.

FIG. 1 illustrates a situation in which an electronic device is connected to a Bluetooth device and a Wireless Fidelity (WiFi) device.

Referring to FIG. 1, an electronic device 100 may be connected to external devices through short-range wireless communication. The short-range wireless communication may include Bluetooth, WiFi, ZigBee, near field communication (NFC), and the like. The electronic device 100 may perform short-range wireless communication with external devices through a communication module. For example, the electronic device 100 may perform Bluetooth communication with a Bluetooth device 200 through a Bluetooth module and perform WiFi communication with a WiFi device 300 through a WiFi module. The Bluetooth device 200 may indicate a device connectable through Bluetooth communication and may be a peer device connectable to the electronic device 100 through Bluetooth communication. The Bluetooth device 200 may include a remote control, a keyboard, a mouse, a speaker, earphones, headphones, or the like. The WiFi device 300 is a device connectable through WiFi communication and may include a wireless access point, a wired/wireless Internet router, or the like connected to the electronic device 100 via WiFi.

The Bluetooth module configured to support Bluetooth communication and the WiFi module configured to support WiFi communication may be implemented as one communication module configured to support both Bluetooth communication and WiFi communication. In the disclosure, the communication module configured to support both Bluetooth communication and WiFi communication is referred to as a Bluetooth-WiFi combo module (or Bluetooth-WiFi combo hardware module).

The Bluetooth-WiFi combo module may include hardware configured to support both Bluetooth communication and WiFi communication. For example, the Bluetooth-WiFi combo module may be implemented by an integrated chip (IC) configured to support both Bluetooth communication and WiFi communication. In addition, the Bluetooth-WiFi combo module may support Bluetooth communication and WiFi communication by using one data interface and hardware reset interface.

When a communication problem occurs in Bluetooth communication or WiFi communication while performing Bluetooth communication and/or WiFi communication through the Bluetooth-WiFi combo module, the electronic device 100 may need to reset the Bluetooth-WiFi combo module to solve the communication problem.

Resetting the Bluetooth-WiFi combo module may indicate resetting the hardware configured to support both Bluetooth communication and WiFi communication. When the hardware configured to support both Bluetooth communication and WiFi communication is reset, both a Bluetooth connection and a WiFi connection through the Bluetooth-WiFi combo module may be released (or lost). That is, when the electronic device 100 resets the Bluetooth-WiFi combo module to solve a communication problem in WiFi communication, a Bluetooth connection of the electronic device 100 with the Bluetooth device 200 may be unexpectedly released.

Therefore, when the electronic device 100 resets the Bluetooth-WiFi combo module due to a WiFi communication problem in a state in which a Bluetooth connection is established with the Bluetooth device 200, various problems may occur due to an unexpected release of the Bluetooth connection, and in the disclosure, a method of solving these problems will be described.

Figure 2:
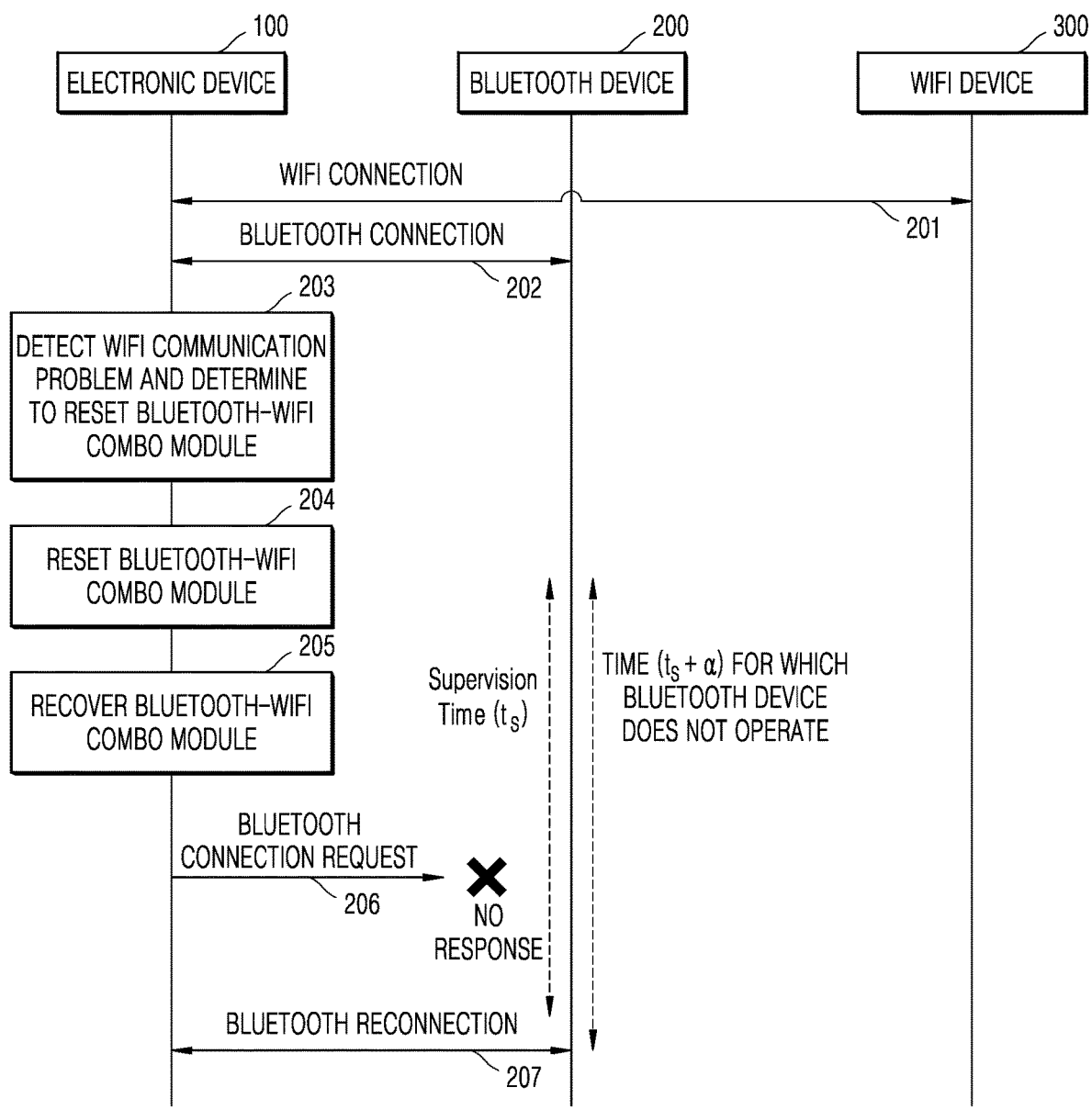
FIG. 2 is a sequence diagram of a situation in which a Bluetooth device reconnection may be delayed when an electronic device resets a Bluetooth-WiFi combo module.

FIG. 2 is a sequence diagram of a situation in which a Bluetooth device reconnection may be delayed when an electronic device resets a Bluetooth-WiFi combo module.

Referring to FIG. 2, the electronic device 100 may be connected to the WiFi device 300 by using WiFi in operation 201 and connected to the Bluetooth device 200 by using Bluetooth in operation 202. Herein, both the WiFi connection and the Bluetooth connection may be established through the Bluetooth-WiFi combo module of the electronic device 100. In operation 203, the electronic device 100 may detect a WiFi communication problem occurring in WiFi communication with the WiFi device 300 and determine to reset the Bluetooth-WiFi combo module to solve the WiFi communication problem. Here, the WiFi communication problem refers to a state in which normal WiFi communication cannot be performed (e.g., WiFi communication is disconnected). In operation 204, the electronic device 100 may reset the Bluetooth-WiFi combo module according to the reset determination. A description of an operation of the electronic device 100 according to operations 203 and 204 will be made below in detail in a description of operations 310 and 320 of FIG. 3.

When the Bluetooth-WiFi combo module is reset, both the Bluetooth connection and the WiFi connection of the Bluetooth-WiFi combo module are initialized, and thus, reconnection or pairing is needed for the electronic device 100 to communicate with the Bluetooth device 200 and the WiFi device 300. When the Bluetooth-WiFi combo module is initialized by the reset, the Bluetooth-WiFi combo module cannot respond to Bluetooth communication from the Bluetooth device 200, and when the Bluetooth device 200 does not receive a response signal from the Bluetooth-WiFi combo module in response to the Bluetooth communication, the Bluetooth device 200 may determine that a problem has occurred in the Bluetooth communication with the Bluetooth-WiFi combo module because the Bluetooth device 200 is not aware that the Bluetooth-WiFi combo module has been initialized by the reset.

In this case, the Bluetooth device 200 may monitor whether the Bluetooth connection has been released, for a time indicated by a Link_Supervision_Timeout parameter (a supervision timeout time $t_s$) according to a standard operation disclosed in Institute of Electrical and Electronics Engineers (IEEE) 802.15.1 6.21 LINK SUPERVISION TIMEOUT, and wait for Bluetooth communication with the Bluetooth-WiFi combo module. That is, when a problem of unknown cause occurs in Bluetooth communication with the Bluetooth-WiFi combo module, the Bluetooth device 200 may not be immediately identify that a Bluetooth connection has been released, but may maintain a mode for establishing a Bluetooth reconnection with the Bluetooth WiFi combo module for the supervision timeout time $t_s$, and then may identify that the Bluetooth connection has been released after the supervision timeout time $t_s$. In this case, the Bluetooth device 200 merely monitors whether an existing Bluetooth connection has been released for the supervision timeout time $t_s$ and does not transmit Bluetooth data or establish a new Bluetooth connection in response to a new Bluetooth connection request.

While the Bluetooth device 200 does not identify that the Bluetooth connection has been released, the Bluetooth-WiFi combo module may be recovered in operation 205. When the Bluetooth-WiFi combo module is recovered, the electronic device 100 enters into a state in which Bluetooth communication is enabled. After the Bluetooth-WiFi combo module is recovered, the electronic device 100 may broadcast a Bluetooth connection request in operation 206. However, when the supervision timeout time $t_s$ has not elapsed, the Bluetooth device 200 cannot identify the Bluetooth connection request of the electronic device 100. Therefore, the Bluetooth device 200 may not respond to the request of the electronic device 100, and accordingly, the electronic device 100 may not retrieve the Bluetooth device 200 as a Bluetooth connectable device. Therefore, a Bluetooth connection between the electronic device 100 the Bluetooth device 200 may not be established.

After the supervision timeout time $t_s$ elapses, the Bluetooth device 200 may identify that the Bluetooth connection with the electronic device 100 has been released and establish a Bluetooth reconnection with the electronic device 100 in operation 207. For example, after identifying the Bluetooth connection release, the Bluetooth device 200 may identify the Bluetooth connection request of the electronic device 100 and establish a Bluetooth reconnection with the electronic device 100 in response to the request. Alternatively, after identifying the Bluetooth connection release, the Bluetooth device 200 may transmit a Bluetooth connection request to the electronic device 100 and establish a Bluetooth reconnection with the electronic device 100.

In a situation as shown in FIG. 2, even if the Bluetooth connection is released according to the resetting of the Bluetooth-WiFi combo module of the electronic device 100, the Bluetooth device 200 may not identify that the Bluetooth connection with the electronic device 100 has been released, for the supervision timeout time is according to a standard operation disclosed in IEEE 802.15.1 6.21 LINK SUPERVISION TIMEOUT, and may not establish a Bluetooth reconnection with the electronic device 100 before the supervision timeout time is elapses. Therefore, when the Bluetooth connection is released according to the resetting of the Bluetooth-WiFi combo module, the Bluetooth device 200 may identify at a later time that the Bluetooth connection has been released, thereby delaying a Bluetooth reconnection. Accordingly, for a time $t_s+\alpha$ until a Bluetooth reconnection is established after the reset of the Bluetooth-WiFi combo module, the Bluetooth device 200 may not normally operate, and Bluetooth data transmission and reception with the electronic device 100 may be suspended.

Figure 3:
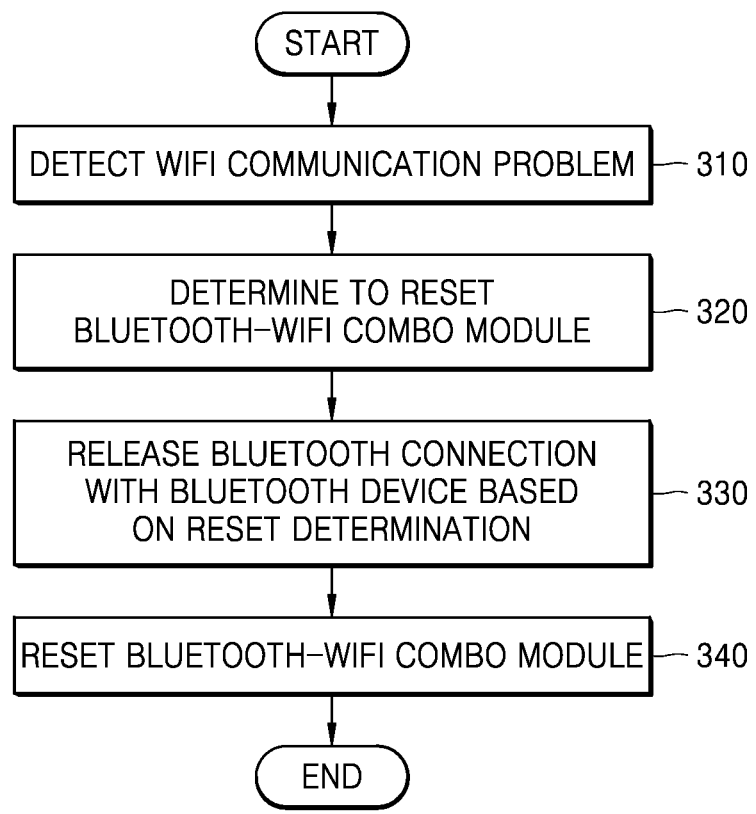
FIG. 3 is a flowchart of a method of operating an electronic device including a Bluetooth-WiFi combo module, according to an embodiment of the disclosure.

FIG. 3 is a flowchart of a method of operating an electronic device including a Bluetooth-WiFi combo module, according to an embodiment of the disclosure. In FIG. 3, it is assumed that the electronic device 100 is connected to the Bluetooth device 200 via Bluetooth and connected to the WiFi device 300 via WiFi.

In operation 310, the electronic device 100 according to an embodiment of the disclosure may detect a WiFi communication problem with the WiFi device 300 connected through the Bluetooth-WiFi combo module.

According to an embodiment of the disclosure, the electronic device 100 may monitor a WiFi communication state of the electronic device 100 with the WiFi device 300. For example, the electronic device 100 may monitor a transmission/reception delay of a WiFi signal, WiFi disconnection, a decrease in the intensity of a WiFi signal, and the like with respect to the WiFi device 300. The electronic device 100 may detect a communication problem occurring in WiFi communication with the WiFi device 300, based on the monitoring result.

In operation 320, the electronic device 100 may determine to reset the Bluetooth-WiFi combo module to recover the WiFi communication to address the WiFi communication problem.

According to an embodiment of the disclosure, the electronic device 100 may determine that the detected WiFi communication problem is caused by a problem in the Bluetooth-WiFi combo module. The electronic device 100 may determine to reset the Bluetooth-WiFi combo module to solve the WiFi communication problem. In the disclosure, resetting the Bluetooth-WiFi combo module may be used to solve the problem occurring in the Bluetooth-WiFi combo module and return to a normal state or an initial state, but the disclosure is not limited thereto, and restarting, rebooting, or the like of the Bluetooth-WiFi combo module may be used instead.

According to an embodiment of the disclosure, resetting the Bluetooth-WiFi combo module may indicate resetting hardware configured to support both Bluetooth communication and WiFi communication. When the hardware configured to support both Bluetooth communication and WiFi communication is reset, both the Bluetooth connection and the WiFi connection through the Bluetooth-WiFi combo module may be released.

In operation 330, the electronic device 100 may release the Bluetooth connection with the Bluetooth device 200 connected through the Bluetooth-WiFi combo module, based on the reset determination.

According to an embodiment of the disclosure, when the electronic device 100 determines to reset the Bluetooth-WiFi combo module, the electronic device 100 may release the Bluetooth connection with the Bluetooth device 200 before resetting the Bluetooth-WiFi combo module. For example, the electronic device 100 may request a Bluetooth disconnection from the Bluetooth device 200 and perform an operation for releasing the Bluetooth connection with the Bluetooth device 200. The operation for releasing the Bluetooth connection may be performed according to a Bluetooth standard operation of IEEE but is not limited thereto.

In operation 340, the electronic device 100 may reset the Bluetooth-WiFi combo module.

According to an embodiment of the disclosure, the electronic device 100 may reset the Bluetooth-WiFi combo module when the Bluetooth connection with the Bluetooth device 200 is released in operation 330.

According to the embodiment of FIG. 3, the electronic device 100 may release the Bluetooth connection with the Bluetooth device 200 in advance before the reset of the Bluetooth-WiFi combo module when the Bluetooth-WiFi combo module is reset due to a WiFi communication problem. By doing this, unlike the situation of FIG. 2 in which a Bluetooth connection is unexpectedly released due to reset of the Bluetooth-WiFi combo module, the Bluetooth device 200 may identify that the Bluetooth connection has been normally released through a Bluetooth disconnection procedure. Therefore, the Bluetooth device 200 may not wait for the supervision timeout time is to monitor whether the Bluetooth connection has been released and may be connected to the electronic device 100 by Bluetooth again when the Bluetooth-WiFi combo module is recovered.

Figure 4:
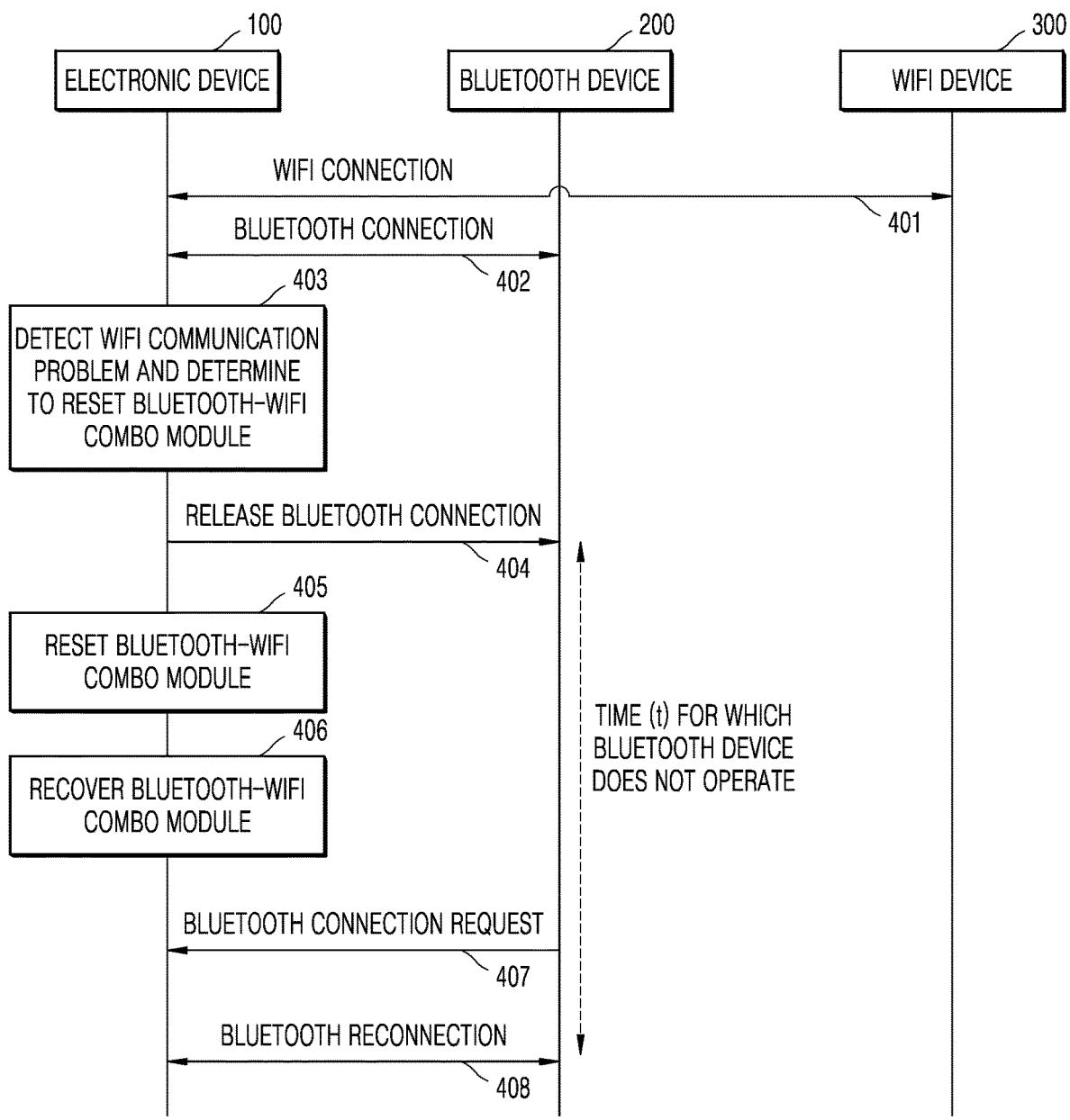
FIG. 4 is a sequence diagram of a method of operating an electronic device including a Bluetooth-WiFi combo module, according to an embodiment of the disclosure.

FIG. 4 is a sequence diagram of a method of operating an electronic device including a Bluetooth-WiFi combo module, according to an embodiment of the disclosure. The description made with reference to FIGS. 2 and 3 is not repeated in a description to be made with reference to FIG. 4.

Referring to FIG. 4, through the Bluetooth-WiFi combo module, the electronic device 100 may be connected to the WiFi device 300 by using WiFi in operation 401 and connected to the Bluetooth device 200 by using Bluetooth in operation 402. In operation 403, the electronic device 100 may detect a WiFi communication problem occurring in WiFi communication with the WiFi device 300 and determine to reset the Bluetooth-WiFi combo module to solve the WiFi communication problem. In operation 404, the electronic device 100 may release the Bluetooth connection with the Bluetooth device 200 according to the reset determination. When the Bluetooth connection is released in response to a request of the electronic device 100, the Bluetooth device 200 may identify the release of the Bluetooth connection.

When the Bluetooth connection is released, the electronic device 100 may reset the Bluetooth-WiFi combo module in operation 405. The Bluetooth device 200 may transmit a Bluetooth connection request to the electronic device 100 after the Bluetooth connection is released. After recovering the Bluetooth-WiFi combo module in operation 406, the electronic device 100 may receive a Bluetooth connection request transmitted from the Bluetooth device 200 in operation 407. In response to the request of the Bluetooth device 200, the electronic device 100 and the Bluetooth device 200 may be connected again by using Bluetooth in operation 408.

Alternatively, although not shown in FIG. 4, after the Bluetooth-WiFi combo module is recovered, the electronic device 100 may transmit a Bluetooth connection request to the Bluetooth device 200, and in response to the request of the electronic device 100, the Bluetooth device 200 and the electronic device 100 may be connected again by using Bluetooth.

Unlike a case where a Bluetooth connection is released due to reset of the Bluetooth-WiFi combo module (e.g., the case of FIG. 2), the Bluetooth device 200 does not have to wait for the supervision timeout time is to determine whether the Bluetooth connection has been released. Therefore, when a Bluetooth connection is released before resetting the Bluetooth-WiFi combo module, a time t for which Bluetooth data cannot be transmitted or received in the embodiment of FIG. 4 is shorter than the time $t_s+\alpha$ for which Bluetooth data cannot be transmitted or received due to reset of the Bluetooth-WiFi combo module in the case of FIG. 2. That is, according to an embodiment of the disclosure, the electronic device 100 may release a Bluetooth connection in advance before resetting the Bluetooth-WiFi combo module, thereby preventing a delay of a Bluetooth reconnection with the Bluetooth device 200.

Figure 5:
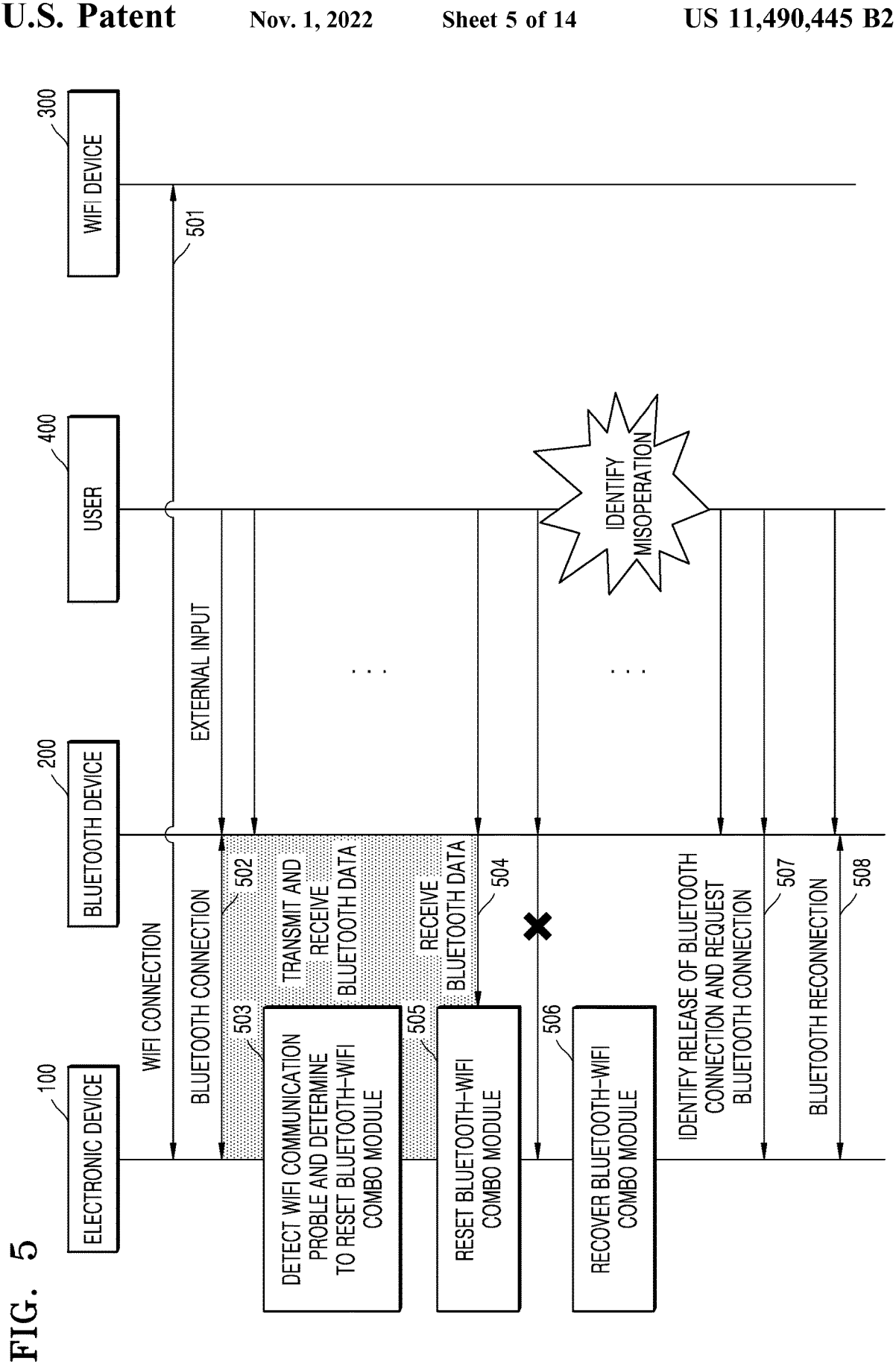
FIG. 5 is a sequence diagram of a situation in which a Bluetooth connection is released regardless of whether to transmit or receive Bluetooth data when an electronic device resets a Bluetooth-WiFi combo module.

FIG. 5 is a sequence diagram of a situation in which a Bluetooth connection is released regardless of whether to transmit or receive Bluetooth data when an electronic device resets a Bluetooth-WiFi combo module.

Referring to FIG. 5, through the Bluetooth-WiFi combo module, the electronic device 100 may be connected to the WiFi device 300 by using WiFi in operation 501 and connected to the Bluetooth device 200 by using Bluetooth in operation 502. The Bluetooth device 200 may receive an external input from a user 400 after being connected to the electronic device 100 by using Bluetooth. The Bluetooth device 200 may transmit or receive Bluetooth data to or from the electronic device 100 based on the external input of the user 400.

In this situation, in operation 503, the electronic device 100 may detect a WiFi communication problem occurring in WiFi communication with the WiFi device 300 and determine to reset the Bluetooth-WiFi combo module to solve the WiFi communication problem. In operation 505, the electronic device 100 may reset the Bluetooth-WiFi combo module according to the reset determination.

According to the resetting of the Bluetooth-WiFi combo module, the Bluetooth connection between the electronic device 100 and the Bluetooth device 200 may be released. In operation 504, the electronic device 100 may receive only Bluetooth data before the Bluetooth connection is released. However, the user 400 may not identify the release of the Bluetooth connection between the electronic device 100 and the Bluetooth device 200 and may provide an external input to the Bluetooth device 200, and the Bluetooth device 200 may not transmit or receive Bluetooth data to or from the electronic device 100 in response to the external input received from the user 400 because of the Bluetooth disconnection. Even if the Bluetooth-WiFi combo module is recovered in operation 506, because the Bluetooth connection has been released, the Bluetooth device 200 may not transmit or receive Bluetooth data to or from the electronic device 100 in response to the external input received from the user 400. Therefore, the user 400 may believe that the Bluetooth device 200 malfunctions, without being aware of what causes the Bluetooth device 200 to operate abnormally.

The Bluetooth device 200 may identify that the Bluetooth connection with the electronic device 100 has been released only after the supervision timeout time is elapses as shown in FIG. 2, and may transmit a Bluetooth connection request to the electronic device 100 in operation 507. In response to the request of the Bluetooth device 200, the electronic device 100 and the Bluetooth device 200 may be connected again by using Bluetooth in operation 508.

The Bluetooth device 200 may perform a Bluetooth data transmission and reception operation according to the external input received from the user 400 only after the Bluetooth device 200 is connected to the electronic device 100 again by using Bluetooth in operation 508.

When the electronic device 100 resets the Bluetooth-WiFi combo module due to occurrence of a WiFi communication problem, there may occur a situation in which a Bluetooth connection is unexpectedly released so that Bluetooth data cannot be transmitted or received. That is, Bluetooth data transmission and reception between the electronic device 100 and the Bluetooth device 200 according to an external input of the user 400 may be unexpectedly suspended due to reset of the Bluetooth-WiFi combo module, and the user 400 may believe that the Bluetooth device 200 operates wrongly. Therefore, to prevent a situation in which the Bluetooth-WiFi combo module is reset due to a WiFi communication problem so that Bluetooth communication is unexpectedly suspended, the electronic device 100 may consider, in resetting the Bluetooth WiFi combo module, whether there exists Bluetooth data to be transmitted or received to or from the Bluetooth device 200.

Figure 6:
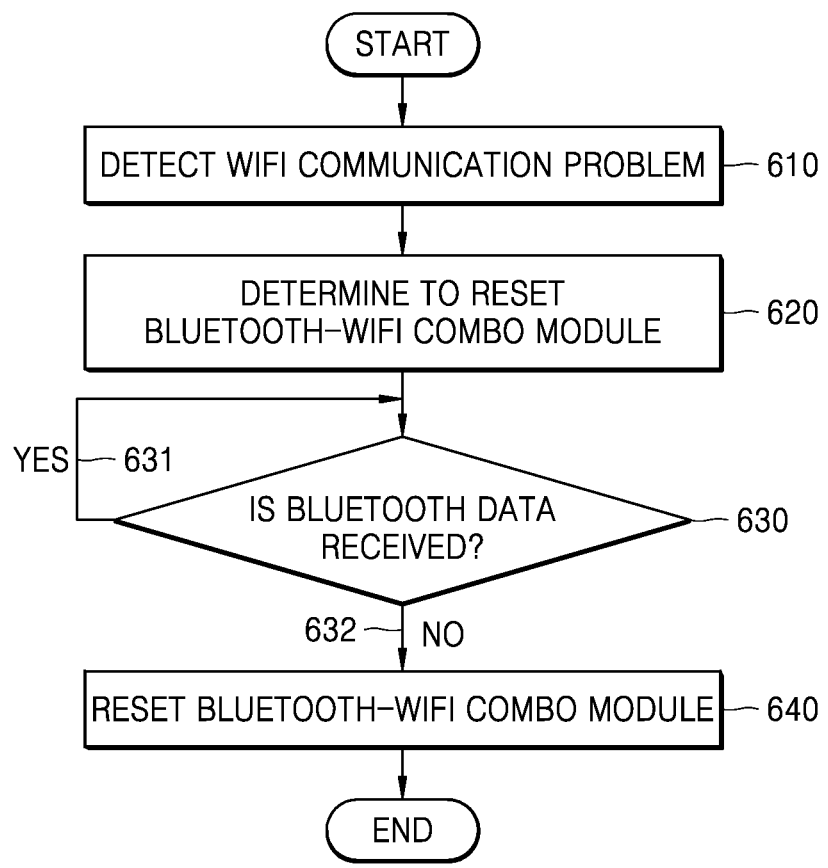
FIG. 6 is a flowchart of a method, performed by an electronic device, of resetting a Bluetooth-WiFi combo module, according to an embodiment of the disclosure.

FIG. 6 is a flowchart of a method, performed by an electronic device, of resetting a Bluetooth-WiFi combo module based on whether to transmit or receive Bluetooth data, according to an embodiment of the disclosure. In FIG. 6, it is assumed that the electronic device 100 is connected to the Bluetooth device 200 via Bluetooth and connected to the WiFi device 300 via WiFi. The description made with reference to FIG. 3 is not repeated in a description to be made with reference to FIG. 6.

In operation 610, the electronic device 100 may detect a WiFi communication problem with the WiFi device 300 connected through the Bluetooth-WiFi combo module.

In operation 620, the electronic device 100 may determine to reset the Bluetooth-WiFi combo module to solve the WiFi communication problem and recover the WiFi communication.

According to an embodiment of the disclosure, the electronic device 100 may reset the Bluetooth-WiFi combo module based on the reset determination and whether Bluetooth data is received from the Bluetooth device 200. For example, when the electronic device 100 determines to reset the Bluetooth-WiFi combo module, the electronic device 100 may reset the Bluetooth-WiFi combo module by determining whether Bluetooth data is received in operations 630 and 640, which are described below.

In operation 630, the electronic device 100 may determine whether Bluetooth data is received from the Bluetooth device 200.

According to an embodiment of the disclosure, the electronic device 100 may determine whether new Bluetooth data is received from the Bluetooth device 200 within a certain time $t_1$ from a time point when most recent Bluetooth data is received from the Bluetooth device 200.

According to an embodiment of the disclosure, the electronic device 100 may operate a timer to monitor whether Bluetooth data is received. The electronic device 100 may start the timer when Bluetooth data is received from the Bluetooth device 200, or restart the timer when Bluetooth data is received from the Bluetooth device 200 if the timer is already operating. The timer may end when no Bluetooth data is received within the certain time $t_1$ from a start time point. When the timer is operating, the electronic device 100 may determine that new Bluetooth data was received from the Bluetooth device 200. In addition, when the timer does not operate because there does not exist data received from the Bluetooth device 200, or when an operating timer ends, the electronic device 100 may determine that new Bluetooth data was not received from the Bluetooth device 200.

According to an embodiment of the disclosure, when new Bluetooth data was received from the Bluetooth device 200 after determining to reset the Bluetooth-WiFi combo module, the electronic device 100 may determine again in operation 631 whether there exists another new Bluetooth data received within the certain time $t_1$ from a time point when the new Bluetooth data was received. Otherwise, when new Bluetooth data was not received from the Bluetooth device 200 in operation 632 (or when the timer ends) after determining to reset the Bluetooth-WiFi combo module, operation 640 may be performed.

In operation 640, the electronic device 100 may reset the Bluetooth-WiFi combo module based on the determination that new Bluetooth data was not received from the Bluetooth device 200.

For example, the electronic device 100 may reset the Bluetooth-WiFi combo module when it is determined in operation 630 that new Bluetooth data was not received within the certain time $t_1$ from a time point when Bluetooth data was most recently received from the Bluetooth device 200.

In FIG. 6, an embodiment in which the electronic device 100 resets the Bluetooth-WiFi combo module based on whether new Bluetooth data was received from the Bluetooth device 200 has been mainly described. However, the embodiment is not limited thereto and may also include an embodiment in which the electronic device 100 resets the Bluetooth-WiFi combo module based on whether there exists new data received from the Bluetooth device 200 within the certain time $t_1$ from a time point when Bluetooth data was most recently transmitted or received to or from the Bluetooth device 200 and/or based on whether there exists new data to be transmitted to the Bluetooth device 200. That is, the electronic device 100 may determine whether there exists Bluetooth data to be newly transmitted or received to or from the Bluetooth device 200, in a similar manner to operation 630, after determining in operation 620 to reset the Bluetooth-WiFi combo module, and reset the Bluetooth-WiFi combo module based on the determination that there does not exist new Bluetooth data to be transmitted or received to or from the Bluetooth device 200.

According to the embodiment of FIG. 6, when the electronic device 100 resets the Bluetooth-WiFi combo module due to a WiFi communication problem, the electronic device 100 may reset the Bluetooth-WiFi combo module based on whether to transmit or receive Bluetooth data to or from the Bluetooth device 200. Therefore, according to the embodiment of FIG. 6, unlike the case of FIG. 5, a situation in which the Bluetooth-WiFi combo module is reset due to a WiFi communication problem so that Bluetooth communication is unexpectedly suspended while there is new Bluetooth data to receive or transmit may be prevented, and the user 400 may not identify a misoperation of the Bluetooth device 200.

Figure 7:
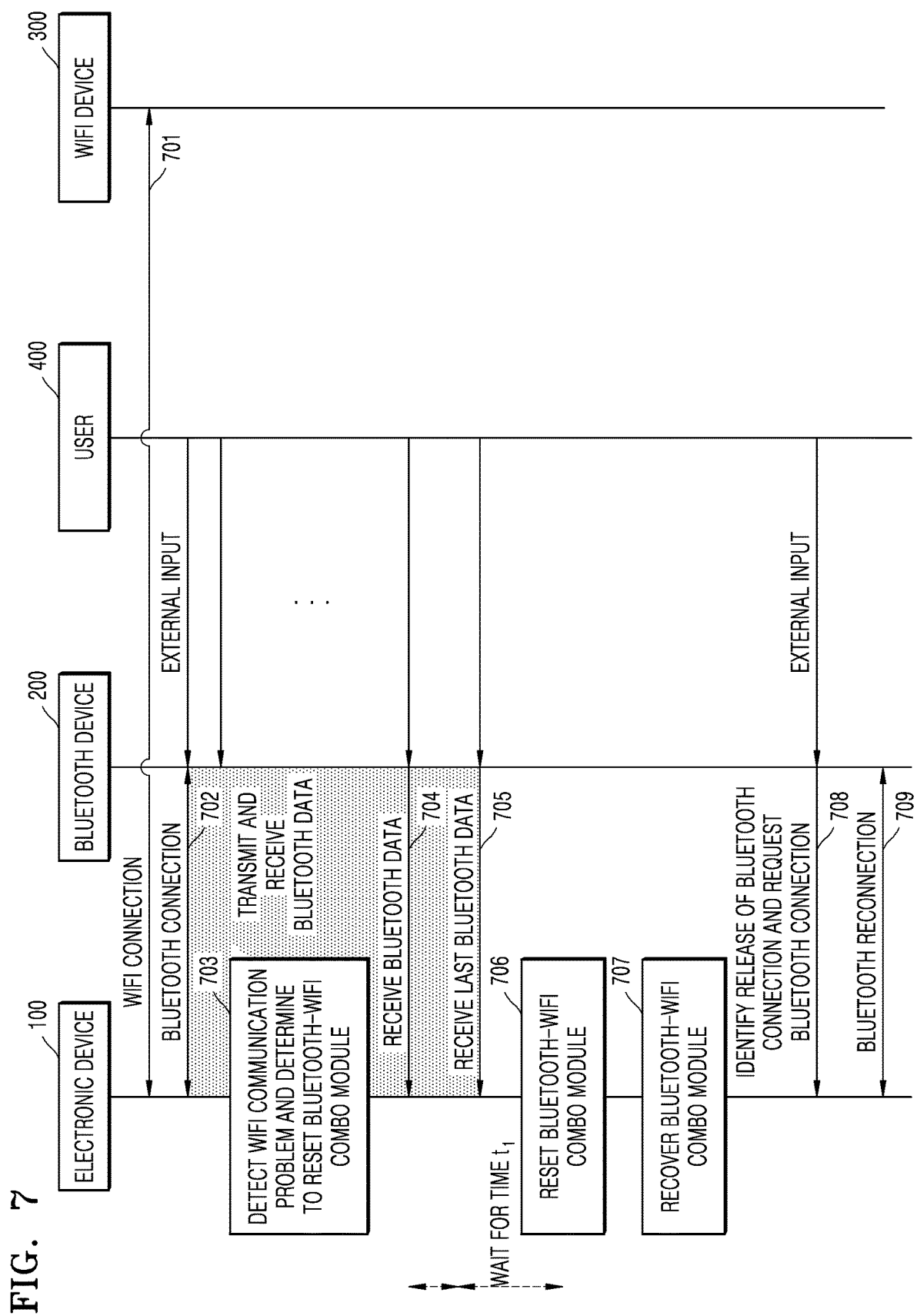
FIG. 7 is a sequence diagram of a method, performed by an electronic device, of resetting a Bluetooth-WiFi combo module, according to an embodiment of the disclosure.

FIG. 7 is a sequence diagram of a method, performed by an electronic device, of resetting a Bluetooth-WiFi combo module based on whether to transmit or receive Bluetooth data, according to an embodiment of the disclosure. The description made with reference to FIGS. 5 and 6 is not repeated in a description to be made with reference to FIG. 7.

Referring to FIG. 7, through the Bluetooth-WiFi combo module, the electronic device 100 may be connected to the WiFi device 300 by using WiFi in operation 701 and connected to the Bluetooth device 200 by using Bluetooth in operation 702. The Bluetooth device 200 may receive an external input from the user 400 after being connected to the electronic device 100 by using Bluetooth. The Bluetooth device 200 may transmit Bluetooth data to the electronic device 100 and receive Bluetooth data from the electronic device 100, based on the external input of the user 400.

In this situation, in operation 703, the electronic device 100 may detect a WiFi communication problem occurring in WiFi communication with the WiFi device 300 and determine to reset the Bluetooth-WiFi combo module to solve the WiFi communication problem.

The electronic device 100 may reset the Bluetooth-WiFi combo module based on the reset determination and whether Bluetooth data is received from the Bluetooth device 200. In operation 704, the electronic device 100 may monitor new Bluetooth data received from the Bluetooth device 200 within the certain time $t_1$ from a time point when Bluetooth data was most recently received from the Bluetooth device 200 before determining the reset. When Bluetooth data is received within the certain time $t_1$ in operation 704, the electronic device 100 may monitor whether new Bluetooth data is received from the Bluetooth device 200 within the certain time $t_1$ again.

When there does not exist Bluetooth data newly received within the certain time $t_1$ after most recently receiving Bluetooth data from the Bluetooth device 200 in operation 705, the electronic device 100 may reset the Bluetooth-WiFi combo module in operation 706. Although FIG. 7 shows that Bluetooth data is most recently received from the Bluetooth device 200 after the electronic device 100 determined to reset the Bluetooth-WiFi combo module, the most recently received Bluetooth data may be received before the reset determination and is not limited to the cases described above.

After recovering the Bluetooth-WiFi combo module in operation 707, the electronic device 100 may receive a Bluetooth connection request transmitted from the Bluetooth device 200 in operation 708. In response to the request of the Bluetooth device 200, the electronic device 100 and the Bluetooth device 200 may be connected again by using Bluetooth in operation 709.

According to the embodiment of FIG. 7, when there does not exist Bluetooth data received from the Bluetooth device 200, the electronic device 100 resets the Bluetooth-WiFi combo module. Therefore, unlike the case of FIG. 5, a situation in which the Bluetooth-WiFi combo module is reset due to a WiFi communication problem so that Bluetooth communication is unexpectedly suspended while there is new Bluetooth data to receive or transmit may be prevented, and the user 400 may not identify a misoperation of the Bluetooth device 200.

Figure 8:
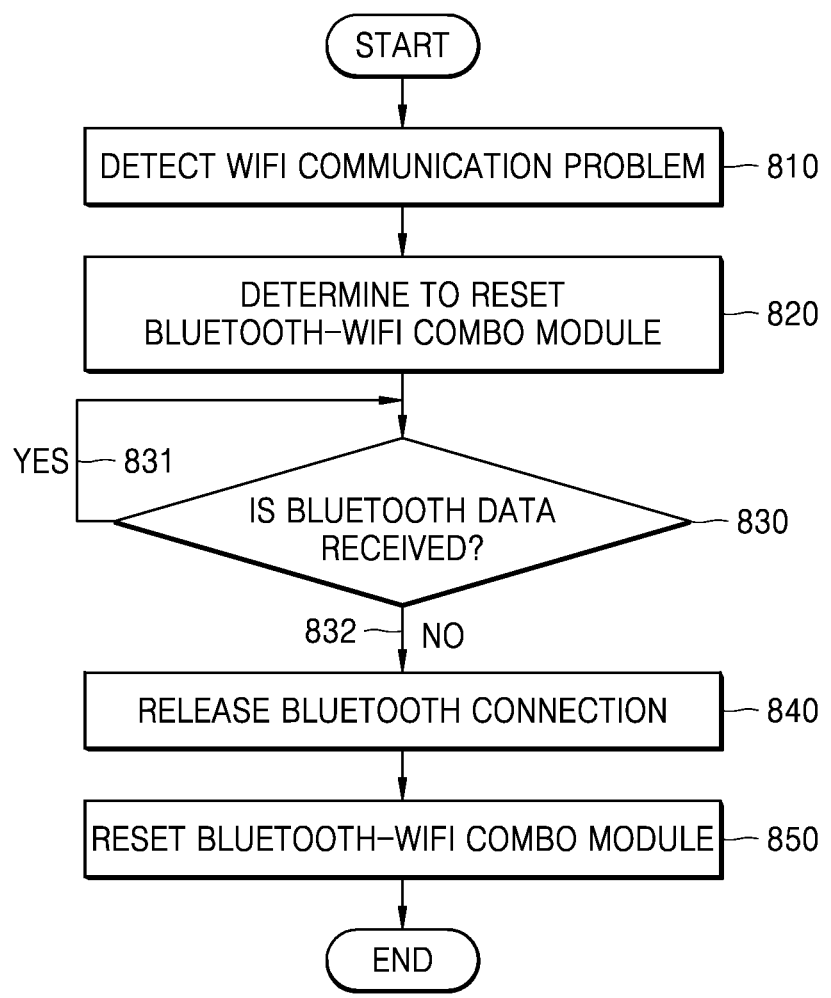
FIG. 8 is a flowchart of a method of resetting a Bluetooth-WiFi combo module in an electronic device, according to an embodiment of the disclosure.

FIG. 8 is a flowchart of a method of resetting a Bluetooth-WiFi combo module in an electronic device, according to an embodiment of the disclosure. The embodiment described with reference to FIG. 8 may be obtained by combining the embodiment described with reference to FIG. 3 and the embodiment described with reference to FIG. 6. The description made with reference to FIGS. 3 and 6 is not repeated in a description to be made with reference to FIG. 8. In FIG. 8, it is assumed that the electronic device 100 is connected to the Bluetooth device 200 by Bluetooth and connected to the WiFi device 300 via WiFi.

In operation 810, the electronic device 100 according to an embodiment of the disclosure may detect a WiFi communication problem with the WiFi device 300 connected through the Bluetooth-WiFi combo module.

In operation 820, the electronic device 100 may determine to reset the Bluetooth-WiFi combo module to recover the WiFi communication from the WiFi communication problem.

According to an embodiment of the disclosure, the electronic device 100 may release the Bluetooth connection with the Bluetooth device 200 based on the reset determination and whether Bluetooth data is received from the Bluetooth device 200. For example, when determining to reset the Bluetooth-WiFi combo module, the electronic device 100 may release the Bluetooth connection by determining whether Bluetooth data is received in operations 830 to 850, which are described below.

In operation 830, the electronic device 100 may determine whether Bluetooth data is received from the Bluetooth device 200. Operation 830, performed by the electronic device 100, of determining whether Bluetooth data is received may correspond to operation 630, performed by the electronic device 100, of FIG. 6.

According to an embodiment of the disclosure, when it is determined in operation 830 that new Bluetooth data was received from the Bluetooth device 200 after determining to reset the Bluetooth-WiFi combo module, the electronic device 100 may determine again in operation 831 whether there exists Bluetooth data received within the certain time $t_1$ from a time point when the new Bluetooth data was received. Otherwise, in operation 832, when it is determined that new Bluetooth data was not received from the Bluetooth device 200 after determining to reset the Bluetooth-WiFi combo module, operation 840 may be performed.

In operation 840, the electronic device 100 may release the Bluetooth connection with the Bluetooth device 200 based on the determination that new Bluetooth data is not received.

For example, the electronic device 100 may reset the Bluetooth-WiFi combo module when it is determined in operation 830 that new Bluetooth data was not received within the certain time $t_1$ from a time point when Bluetooth data was most recently received from the Bluetooth device 200.

In operation 850, the electronic device 100 may reset the Bluetooth-WiFi combo module.

According to an embodiment of the disclosure, the electronic device 100 may reset the Bluetooth-WiFi combo module when the Bluetooth connection with the Bluetooth device 200 is released in operation 840.

According to the embodiment of FIG. 8, when the electronic device 100 resets the Bluetooth-WiFi combo module due to a WiFi communication problem, the electronic device 100 may release the Bluetooth connection with the Bluetooth device 200 in advance based on whether to transmit or receive Bluetooth data. Therefore, unlike the case of FIG. 5, a situation in which the Bluetooth-WiFi combo module is reset due to a WiFi communication problem so that Bluetooth communication is unexpectedly suspended may be prevented, and the user 400 may not identify a misoperation of the Bluetooth device 200. In addition, according to the embodiment of FIG. 8, unlike the case of FIG. 2, the electronic device 100 may release a Bluetooth connection in advance before resetting the Bluetooth-WiFi combo module, thereby preventing a delay of a Bluetooth reconnection with the Bluetooth device 200.

Figure 9:
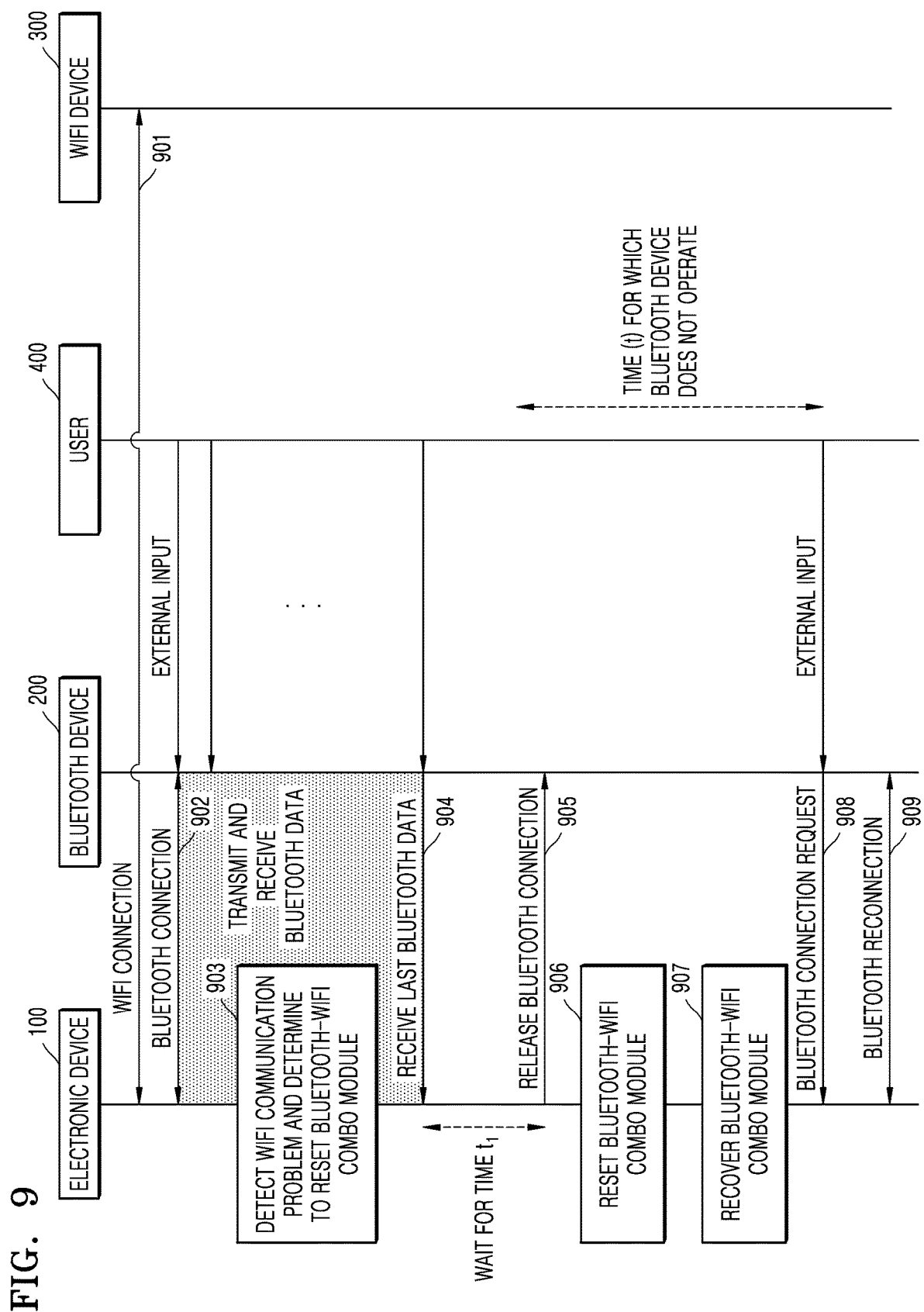
FIG. 9 is a sequence diagram of a method of resetting a Bluetooth-WiFi combo module in an electronic device, according to an embodiment of the disclosure.

FIG. 9 is a sequence diagram of a method of resetting a Bluetooth-WiFi combo module in an electronic device, according to an embodiment of the disclosure. The description made with reference to FIG. 8 is not repeated in a description to be made with reference to FIG. 9.

Referring to FIG. 9, through the Bluetooth-WiFi combo module, the electronic device 100 may be connected to the WiFi device 300 by using WiFi in operation 901 and connected to the Bluetooth device 200 by using Bluetooth in operation 902. The Bluetooth device 200 may receive an external input from the user 400 after being connected to the electronic device 100 by using Bluetooth. The Bluetooth device 200 may transmit Bluetooth data to the electronic device 100 and receive Bluetooth data from the electronic device 100, based on the external input of the user 400.

In this situation, in operation 903, the electronic device 100 may detect a WiFi communication problem occurring in WiFi communication with the WiFi device 300 and determine to reset the Bluetooth-WiFi combo module to solve the WiFi communication problem.

The electronic device 100 may release the Bluetooth connection with the Bluetooth device 200 based on the reset determination and whether Bluetooth data is received from the Bluetooth device 200. The electronic device 100 may release the Bluetooth connection with the Bluetooth device 200 in operation 905 when new Bluetooth data was not received from the Bluetooth device 200 within the certain time $t_1$ from a time point when Bluetooth data was most recently received from the Bluetooth device 200 in operation 904.

When the Bluetooth connection is released, the electronic device 100 may reset the Bluetooth-WiFi combo module in operation 906. The Bluetooth device 200 may transmit a Bluetooth connection request to the electronic device 100 after the Bluetooth connection is released. After recovering the Bluetooth-WiFi combo module in operation 907, the electronic device 100 may receive a Bluetooth connection request transmitted from the Bluetooth device 200 in operation 908. In response to the request of the Bluetooth device 200, the electronic device 100 and the Bluetooth device 200 may be connected again by using Bluetooth in operation 909.

According to the embodiment of FIG. 9, a situation in which the Bluetooth-WiFi combo module is reset due to a WiFi communication problem so that Bluetooth communication is unexpectedly suspended may be prevented, and the user 400 may not identify a misoperation of the Bluetooth device 200. In addition, the electronic device 100 may release a Bluetooth connection in advance before resetting the Bluetooth-WiFi combo module, thereby preventing a delay of a Bluetooth reconnection with the Bluetooth device 200 ($t<t_s+\alpha$).

Figure 10A:
FIG. 10A illustrates an example of a message, output by an electronic device, according to an embodiment of the disclosure.
Figure 10B:
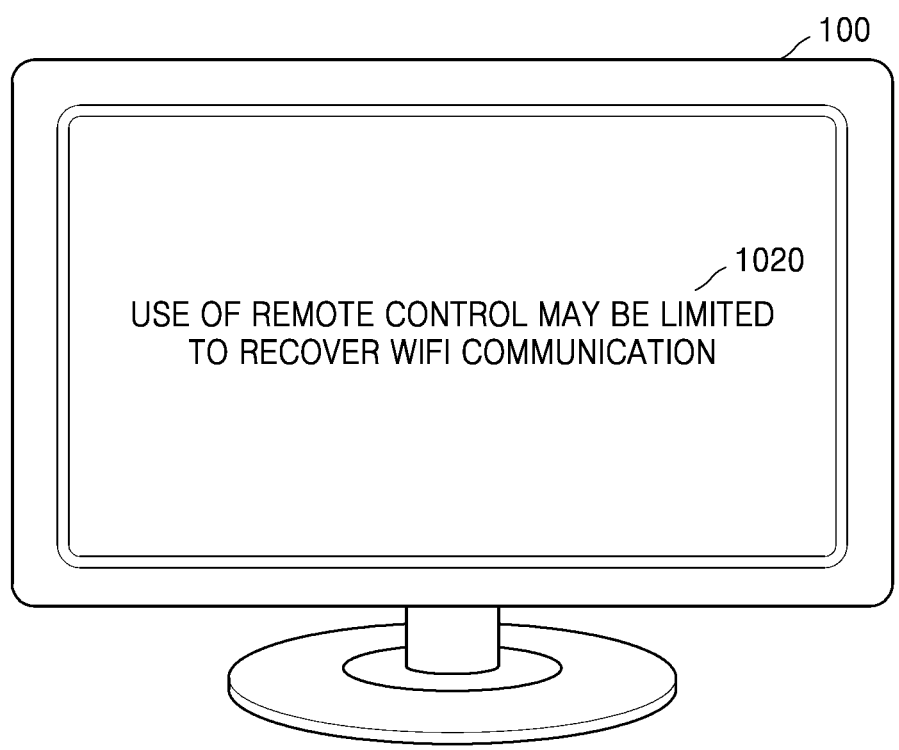
FIG. 10B illustrates an example of a message, output by an electronic device, according to an embodiment of the disclosure.

FIGS. 10A and 10B illustrate messages, output by an electronic device, indicating that the use of a Bluetooth device may be limited due to a WiFi communication problem, according to an embodiment of the disclosure.

According to an embodiment of the disclosure, the electronic device 100 may determine to reset the Bluetooth-WiFi combo module to recover WiFi communication from a WiFi communication problem with the WiFi device 300 and output, based on the reset determination, a notification message indicating that the use of the Bluetooth device 200 may be limited to recover WiFi communication. For example, the electronic device 100 may output a notification message indicating that the use of the Bluetooth device 200 may be limited to recover WiFi communication, before releasing the Bluetooth connection with the Bluetooth device 200 or resetting the Bluetooth-WiFi combo module according to the reset determination.

According to an embodiment of the disclosure, the electronic device 100 may output, through a display, a notification message indicating that the use of the Bluetooth device 200 may be limited to recover WiFi communication. The notification message may include information indicating that a cause by which the use of the Bluetooth device 200 is limited is to solve a WiFi communication problem. In addition, the notification message is not limited to a form described above as long as the notification message includes the content indicating that the use of the Bluetooth device 200 may be limited and/or that the cause of the limited use of the Bluetooth device 200 is to recover WiFi communication. For example, the notification message may include the content indicating that the use of the Bluetooth device 200 may be limited, the content indicating that the Bluetooth device 200 may not normally operate, the content indicating that Bluetooth communication may be temporarily suspended, or the like. As an example, the electronic device 100 may display a notification message 1010 indicating that "the use of the Bluetooth device 200 may be limited to recover WiFi communication" as shown in FIG. 10A. In this case, the electronic device 100 may display the notification message 1010 on the display by using a separate image or video. Alternatively, the electronic device 100 may display, in an overlay manner, the notification message 1010 on a video displayed on the display. However, the form of the notification message 1010 is not limited to these examples.

According to an embodiment of the disclosure, the electronic device 100 may output, by using a sound, a notification message indicating that the use of the Bluetooth device 200 may be limited to recover WiFi communication. For example, the electronic device 100 may output, through a speaker by using a sound, a notification message indicating that the use of the Bluetooth device 200 may be limited to recover WiFi communication. However, the form of the notification message 1010 is not limited to this example.

According to an embodiment of the disclosure, a notification message indicating that the use of the Bluetooth device 200 may be limited to recover WiFi communication may include identification information of the Bluetooth device 200. According to the reset determination, the electronic device 100 may identify the Bluetooth device 200 connected through Bluetooth communication and output a notification message including the identification information of the identified Bluetooth device 200. The identification information of the Bluetooth device 200 may include a type (e.g., a remote control, a speaker, earphones, or the like), a product name named by a manufacturer, an identification number (e.g., a product number or a serial number), and the like of the Bluetooth device 200. For example, as shown in FIG. 10B, when the identified Bluetooth device 200 is a remote control, the electronic device 100 may output a notification message 1020 indicating that "the use of the remote control may be limited to recover WiFi communication" including information about the "remote control", a product type, as the identification information of the Bluetooth device 200. When the electronic device 100 is connected to a plurality of Bluetooth devices through Bluetooth, a notification message may include a list of pieces of identification information of the plurality of Bluetooth devices connected to the electronic device 100.

According to an embodiment of the disclosure, a notification message indicating that the use of the Bluetooth device 200 may be limited to recover WiFi communication may include information about a time during which the use of the Bluetooth device 200 may be limited. For example, the electronic device 100 may output a notification message including information indicating that the use of the Bluetooth device 200 may be limited until WiFi communication is recovered, information indicating that the use of the Bluetooth device 200 may be limited until Bluetooth is connected again, or the like.

According to an embodiment of the disclosure, the electronic device 100 may transmit, to the Bluetooth device 200, information indicating that the use of the Bluetooth device 200 may be limited to recover WiFi communication, so that the Bluetooth device 200 outputs a notification message indicating that the use of the Bluetooth device 200 may be limited to recover WiFi communication. For example, when the Bluetooth device 200 includes a device such as a display or a speaker capable of outputting a screen image or a sound, the electronic device 100 may transmit, to the Bluetooth device 200, information indicating that the use of the Bluetooth device 200 may be limited and/or that the cause of the limited use of the Bluetooth device 200 is to recover WiFi communication, so that the Bluetooth device 200 outputs, by using a screen image or a sound, a message indicating that the use of the Bluetooth device 200 is limited. However, the form of the message is not limited to the image or the sound.

Figure 10C:
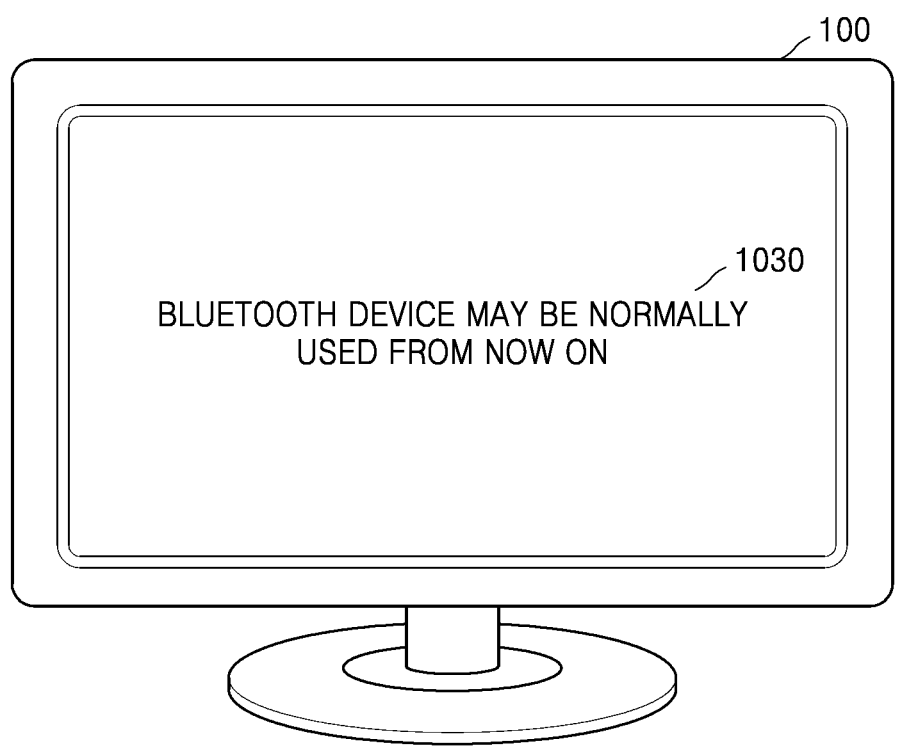
FIG. 10C illustrates an example of a message, output by an electronic device, according to an embodiment of the disclosure.

FIG. 10C illustrates a message, output by an electronic device, indicating that a Bluetooth device may be normally used, according to an embodiment of the disclosure.

According to an embodiment of the disclosure, when a reset Bluetooth-WiFi combo module is recovered, the electronic device 100 may output a message to inform that the Bluetooth device 200 may be normally used. The electronic device 100 may output the message to inform that the Bluetooth device 200 may be normally used, in the same or similar manner as the aforementioned notification message indicating that the use of the Bluetooth device 200 may be limited. For example, as shown in FIG. 10C, the electronic device 100 may display, on the display, a notification message 1030 indicating that "the Bluetooth device 200 may be normally used from now on".

According to an embodiment of the disclosure, when a reset Bluetooth-WiFi combo module is recovered, the electronic device 100 may establish a Bluetooth reconnection with the Bluetooth device 200 and output, after establishing the Bluetooth reconnection, a message to inform that the Bluetooth device 200 may be normally used.

In a situation in which the Bluetooth-WiFi combo module is reset and then recovered, the electronic device 100 may output a notification message indicating that the use of the Bluetooth device 200 may be limited, a notification message indicating that the Bluetooth device 200 may be normally used, and the like, so that, even if the Bluetooth-WiFi combo module is reset or a Bluetooth connection is released according to reset determination, it is prevented that the user mistakenly believes that the Bluetooth device 200 cannot be used after the Bluetooth reconnection is established. That is, the electronic device 100 may provide in advance, to the user 400 through a notification message, information about whether the Bluetooth device 200 is available, so that the user 400 may smoothly use the Bluetooth device 200.

Figure 11:
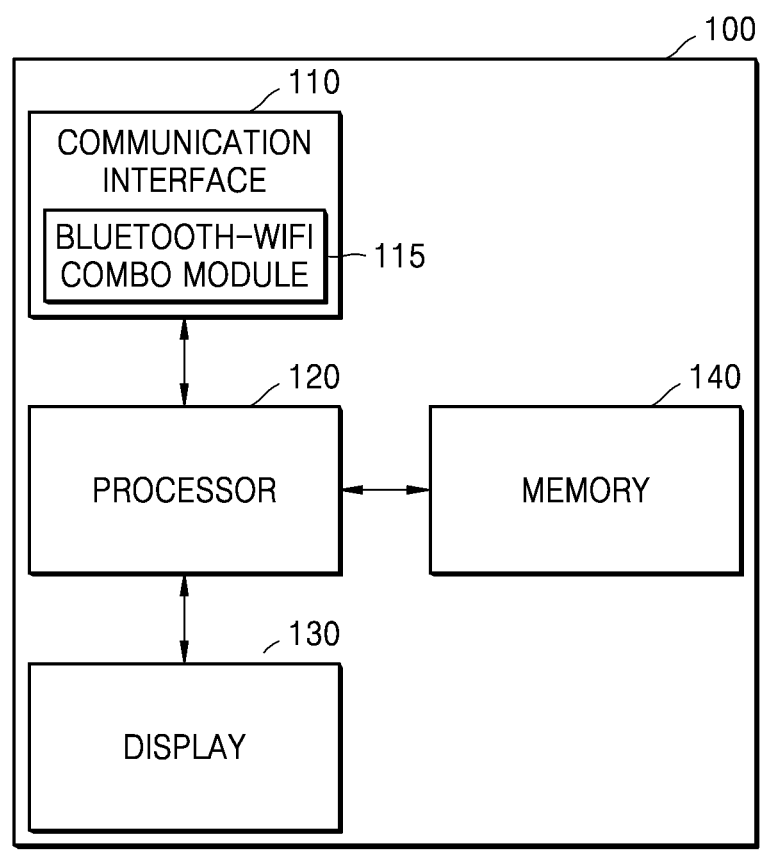
FIG. 11 is a block diagram of an electronic device according to an embodiment of the disclosure.

FIG. 11 is a block diagram of an electronic device according to an embodiment of the disclosure.

Referring to FIG. 11, the electronic device 100 according to an embodiment of the disclosure may include a communication interface 110, a processor 120, a display 130, and a memory 140.

The communication interface 110 according to an embodiment of the disclosure may transmit and receive data or a signal to and from an external device or an external server under control of the processor 120. The communication interface 110 may transmit and receive data or a signal in at least one of a wireless local area network (LAN) (e.g., WiFi) scheme, a Bluetooth scheme, a wired Ethernet scheme, an infrared (IR) scheme, a Bluetooth Low Energy (BLE) scheme, an ultrasound scheme, or a ZigBee scheme. Herein, the communication interface 110 may include at least one communication module capable of transmitting and receiving data according to communication standards corresponding to wireless LAN (e.g., WiFi), Bluetooth, wired Ethernet, IR, BLE, ultrasound wave, or ZigBee described above.

According to an embodiment of the disclosure, the communication interface 110 may include a Bluetooth-WiFi combo module 115. The Bluetooth-WiFi combo module 115 may include an integrated chipset in which a WiFi chipset that is a WiFi module capable of transmitting a packet-type data according to a WiFi communication standard is integrated with a Bluetooth chipset that is a Bluetooth module capable of transmitting a packet-type data according to a Bluetooth communication standard. The communication interface 110 may perform Bluetooth communication and WiFi communication through the Bluetooth-WiFi combo module 115.

The processor 120 according to an embodiment of the disclosure may generally control an operation of the electronic device 100. In addition, the processor 120 may control other components included in the electronic device 100 so as to perform a certain operation.

The processor 120 according to an embodiment of the disclosure may execute one or more programs stored in the memory 140. The processor 120 may include a single core, dual cores, triple cores, quadruple cores, or cores of a multiple thereof. In addition, the processor 120 may include a plurality of processors.

The memory 140 according to an embodiment of the disclosure may store various data, programs, or applications to operate and control the electronic device 100.

In addition, a program stored in the memory 140 may include one or more instructions. The program (one or more instructions) or an application stored in the memory 140 may be executed by the processor 120.

The processor 120 according to an embodiment of the disclosure may detect a WiFi communication problem with the WiFi device 300 connected through the Bluetooth-WiFi combo module 115, and determine to reset the Bluetooth-WiFi combo module 115 to recover WiFi communication from the WiFi communication problem. In addition, the processor 120 may release a Bluetooth connection with the Bluetooth device 200 connected through the Bluetooth-WiFi combo module 115 based on the reset determination and reset the Bluetooth-WiFi combo module 115.

The processor 120 according to an embodiment of the disclosure may release the Bluetooth connection with the Bluetooth device 200 based on the determination of the reset of the Bluetooth-WiFi combo module 115 and whether Bluetooth data is received from the Bluetooth device 200. The processor 120 may determine whether new Bluetooth data was received from the Bluetooth device 200 within a certain time period from a time point when Bluetooth data was most recently received from the Bluetooth device 200, and release the Bluetooth connection with the Bluetooth device 200 based on the determination that new Bluetooth data was not received from the Bluetooth device 200 within the certain time period.

When the Bluetooth-WiFi combo module 115 is reset and then recovered, the processor 120 according to an embodiment of the disclosure may receive a message for requesting a Bluetooth connection from the Bluetooth device 200 and establish a Bluetooth reconnection with the Bluetooth device 200 based on the Bluetooth connection request message.

The processor 120 according to an embodiment of the disclosure may output a notification message indicating that the use of the Bluetooth device 200 may be limited to recover WiFi communication, based on the reset determination. The processor 120 may identify the Bluetooth device 200 connected through Bluetooth communication, and the notification message may include the identification information of the Bluetooth device 200. In addition, the notification message may include information about a time during which the use of the Bluetooth device 200 may be limited.

Figure 12:
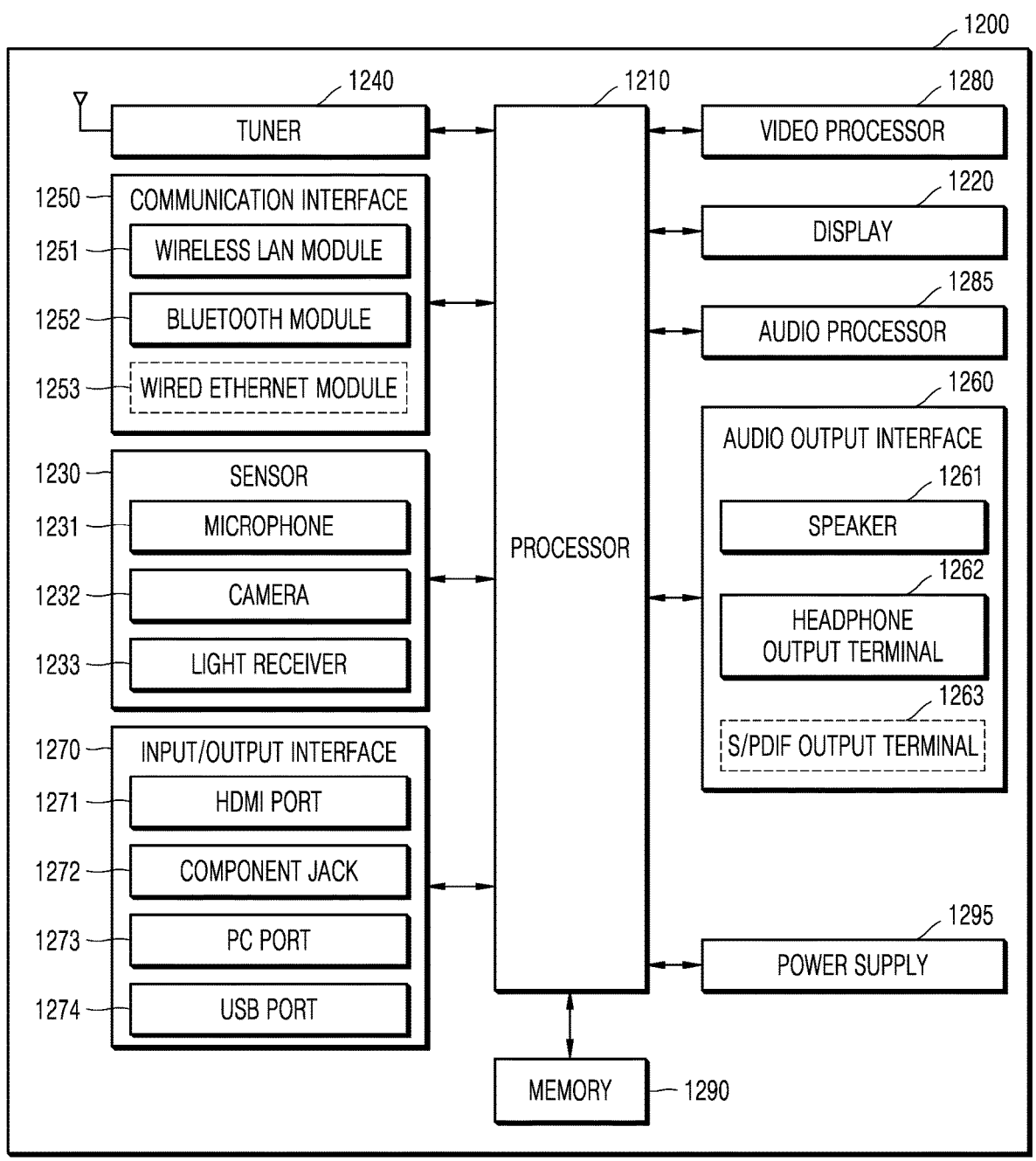
FIG. 12 is a block diagram of an electronic device according to an embodiment of the disclosure.

FIG. 12 is a block diagram of an electronic device according to another embodiment of the disclosure.

An electronic device 1200 of FIG. 12 may be an embodiment of the electronic device 100 described with reference to FIGS. 1 to 11.

Referring to FIG. 12, the electronic device 1200 according to an embodiment of the disclosure may include a tuner 1240, a processor 1210, a display 1220, a communication interface 1250, a sensor 1230, an input/output interface 1270, a video processor 1280, an audio processor 1285, an audio output interface 1260, a memory 1290, and a power supply 1295.

The communication interface 1250, the processor 1210, the display 1220, and the memory 1290 of FIG. 12 correspond to the communication interface 110, the processor 120, the display 130, and the memory 140 of FIG. 11, respectively, and thus, the same description as those made with reference to FIG. 11 is not repeated herein.

The tuner 1240 according to an embodiment of the disclosure may tune and select only a frequency of a channel to be received by the electronic device 1200, from among a plurality of frequency components through amplification, mixing, resonance, and the like of a broadcast signal received in a wired or wireless manner. The broadcast signal may include audio, video, and/or additional information (e.g., electronic program guide (EPG)).

The tuner 1240 may receive the broadcast signal from various sources such as a terrestrial broadcasting station, a cable broadcasting station, a satellite broadcasting station, and an Internet broadcasting station. The tuner 1240 may also receive the broadcast signal from a source such as an analog broadcasting station or a digital broadcasting station.

The communication interface 1250 according to an embodiment of the disclosure may transmit and receive data or a signal to and from an external device or a server under control of the processor 1210. The processor 1210 may transmit and receive content to and from an external device connected through the communication interface 1250, download an application from the external device, or perform web browsing.

In addition, the communication interface 1250 may include a module combination including one or more of a wireless LAN module 1251, a Bluetooth module 1252, and a wired Ethernet module 1253. The wireless LAN module 1251 and the Bluetooth module 1252 may be integrated to implement the Bluetooth-WiFi combo module 115 described above.

The video processor 1280 processes video data received by the electronic device 1200. The video processor 1280 may perform various kinds of image processing such as decoding, scaling, noise filtering, frame rate conversion, and resolution conversion on the video data.

The sensor 1230 senses a voice of a user, an image of the user, or an interaction of the user and may include a microphone 1231, a camera 1232, and a light receiver 1233.

The microphone 1231 receives a voice uttered from the user. The microphone 1231 may convert the received voice into an electrical signal and output the electrical signal to the processor 1210. The user's voice may include, for example, a voice corresponding to a menu or a function of the electronic device 1200.

The camera 1232 may receive a video (e.g., consecutive frames) corresponding to the user's motion including a gesture within a camera recognition range. The processor 1210 may select a menu displayed on the electronic device 1200 or perform a control corresponding to a motion recognition result, by using a recognition result of the received motion.

The light receiver 1233 receives an optical signal (including a control signal) received from an external control device, through an optical window (not shown) of a bezel of the display 1220. The light receiver 1233 may receive an optical signal corresponding to a user input (e.g., a touch, a press, a touch gesture, a voice, or a motion) from a control device. A control signal may be extracted from the received optical signal under control of the processor 1210.

The input/output interface 1270 receives a video (e.g., a moving picture or the like), an audio (e.g., a voice, music, or the like), and additional information (e.g., EPG or the like) from the outside of the electronic device 1200. The input/output interface 1270 may include one of a high-definition multimedia interface (HDMI) port 1271, a component jack 1272, a personal computer (PC) port 1273, and a universal serial bus (USB) port 1274. The input/output interface 1270 may include a combination of the HDMI port 1271, the component jack 1272, the PC port 1273, and the USB port 1274.

The processor 1210 controls a general operation of the electronic device 1200 and a signal flow between internal components of the electronic device 1200 and performs a data processing function. The processor 1210 may execute an operating system (OS) and various applications stored in the memory 1290 when a user input is received or when a previously set and stored condition is satisfied.

The processor 1210 may include random access memory (RAM) storing a signal or data input from the outside of the electronic device 1200 or used as a storage region corresponding to various tasks to be performed by the electronic device 1200, read only memory (ROM) storing a control program for a control of the electronic device 1200, and a processor.

The processor 1210 may include a graphics processor (not shown). The graphics processor (not shown) generates a screen image including various objects such as an icon, an image, and a text by using a calculation unit (not shown) and a renderer (not shown). The calculation unit calculates attribute values such as a coordinate value, a shape, a size, and a color of each object to be displayed, according to a screen layout by using a user input sensed by the sensor 1230. The renderer generates various layouts of screen images including objects based on the attribute values calculated by the calculation unit. A screen image generated by the renderer is displayed in a display area of the display 1220.

The audio processor 1285 processes audio data. The audio processor 1285 may perform various kinds of processing such as decoding, amplification, and noise filtering on the audio data. The audio processor 1285 may include a plurality of audio processing modules to process audio corresponding to a plurality of pieces of content.

The audio output interface 1260 outputs audio included in a broadcast signal received through the tuner 1240, under control of the processor 1210. The audio output interface 1260 may output audio (e.g., a voice or a sound) input through the communication interface 1250 or the input/output interface 1270. In addition, the audio output interface 1260 may output audio stored in the memory 1290, under control of the processor 1210. The audio output interface 1260 may include at least one of a speaker 1261, a headphone output terminal 1262, or a Sony/Philips digital interface (S/PDIF) output terminal 1263. The audio output interface 1260 may include a combination of the speaker 1261, the headphone output terminal 1262, and the S/PDIF output terminal 1263.

The power supply 1295 supplies power input from an external power source to the internal components of the electronic device 1200, under control of the processor 1210. Alternatively, the power supply 1295 may supply power output from one or more batteries (not shown) located inside the electronic device 1200 to the internal components, under control of the processor 1210.

The memory 1290 may store various kinds of data, programs, or applications for driving and controlling the electronic device 1200, under control of the processor 1210. The memory 1290 may include, for example but not limited to, a broadcast reception module, a channel control module, a volume control module, a communication control module, a voice recognition module, a motion recognition module, a light reception module, a display control module, an audio control module, an external input control module, a power control module, a module for controlling power of an external device connected in a wireless manner (e.g., Bluetooth), a voice database (DB), or a motion DB, which are not shown. The modules and DBs of the memory 1290 may be implemented in a software form to perform, in the electronic device 1200, various functions such as, for example but not limited to, a broadcast reception control function, a channel control function, a volume control function, a communication control function, a voice recognition function, a motion recognition function, a light reception control function, a display control function, an audio control function, an external input control function, a power control function, or a function of controlling power of an external device connected in a wireless manner (e.g., Bluetooth). The processor 1210 may perform each function by using the software stored in the memory 1290.

The block diagrams of the electronic devices 100 and 1200 shown in FIGS. 11 and 12 are only illustrative. Each component of the block diagrams may be integrated, added, or omitted according to the specification of the electronic devices 100 and 1200 actually implemented. That is, in accordance with circumstances, two or more components may be integrated into one component, or one component may be divided into two or more components. In addition, a function performed by each block is to describe example embodiments, and a particular operation or device thereof does not limit the right scope of the disclosure.

The method of operating the electronic device 100 may be implemented in a form of program commands executable by various computer means and recorded on a non-transitory computer-readable recording medium. The non-transitory computer-readable recording medium may include program commands, data files, data structures, and the like, taken alone or in combination. The program commands recorded on the non-transitory computer-readable recording medium may be specially designed and constructed for the disclosure or may be known to and usable by one of ordinary skill in a field of computer software. Examples of the non-transitory computer-readable recording medium include magnetic media, e.g., hard discs, floppy discs, or magnetic tapes, optical media, e.g., compact disc-read only memories (CD-ROMs), or digital versatile discs (DVDs), magneto-optical media, e.g., floptical discs, and hardware devices that are specially configured to store and carry out program commands, e.g., ROMs, RAMs, or flash memories. Examples of the program commands include a high-level language code that may be executed by a computer using an interpreter as well as a machine language code made by a complier.

In addition, a method of operating an electronic device, according to the embodiments, may be provided by being included in a computer program product. The computer program product may be traded between a seller and a purchaser.

The computer program product may include a software (S/W) program and a non-transitory computer-readable storage medium in which the S/W program is stored. For example, the computer program product may include an S/W program form of product (e.g., a downloadable application) electronically distributed through a manufacturing company of the electronic device or an electronic market (e.g., GOOGLE PLAYSTORE, or APP STORE). For the electronic distribution, at least a portion of the S/W program may be stored in a storage medium or temporarily generated. In this case, the storage medium may be included in a server of the manufacturing company, a server of the electronic market, or a relay server configured to temporarily store the S/W program.

The computer program product may include a storage medium of a server or a storage medium of a client device in a system including the server and the client device. Alternatively, when a third device (e.g., a smartphone) connected to the server or the client device through communication exists, the computer program product may include a storage medium of the third device. Alternatively, the computer program product may include the S/W program to be transmitted from the server to the client device or the third device or transmitted from the third device to the client device.

In this case, one of the server, the client device, and the third device may execute the computer program product and perform the method(s) according to the embodiments. Alternatively, two or more of the server, the client device, and the third device may execute the computer program product and perform the method(s) according to the embodiments in a distributed fashion.

For example, a server (e.g., a cloud server or an artificial intelligence server) may execute a computer program product stored in the server to control a client device connected to the server through communication, wherein the client device performs the methods according to the disclosed embodiments.

An electronic device according to an embodiment of the disclosure may reduce an influence exerted on Bluetooth communication when a Bluetooth-WiFi combo module is reset to recover a WiFi communication problem.

At least one of the components, elements, modules or units described herein may be embodied as various numbers of hardware, software and/or firmware structures that execute respective functions described above, according to an embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above embodiments may be implemented in algorithms that execute on one or more processors. Furthermore, the components, elements or units represented by a block or processing operations may employ any number of related art techniques for electronics configuration, signal processing and/or control, data processing and the like.

Although a few example embodiments have been shown and described, it would be appreciated by those skilled in the art that changes may be made in example embodiments without departing from the principles and spirit of the disclosure, the scope of which is defined in the claims and their equivalents.

What is claimed is:

1. An electronic device comprising:
 a communication interface comprising a Bluetooth-Wireless Fidelity (WiFi) combo module, the Bluetooth-WiFi combo module configured to provide a WiFi communication for communicating with an external WiFi device and a Bluetooth connection;
 a memory storing one or more instructions; and
 a processor configured to execute the one or more instructions stored in the memory to:
  detect that the WiFi communication of the Bluetooth-WiFi combo module is to be recovered; and
  release, based on detection that the WiFi communication of the Bluetooth-WiFi combo module is to be recovered, a Bluetooth connection with a Bluetooth device connected through the Bluetooth-WiFi combo module, and subsequently reset the Bluetooth-WiFi combo module to recover the WiFi communication.

2. The electronic device of claim 1, wherein the Bluetooth-WiFi combo module comprises hardware configured to support Bluetooth communication and the WiFi communication.

3. The electronic device of claim 2, wherein the processor is further configured to execute the one or more instructions to reset the hardware configured to support the Bluetooth communication and the WiFi communication, based on the released Bluetooth connection with the Bluetooth device.

4. The electronic device of claim 1, wherein the processor is further configured to execute the one or more instructions to:
receive, based on the Bluetooth-WiFi combo module being reset, a request for the Bluetooth connection from the Bluetooth device; and
establish a Bluetooth reconnection with the Bluetooth device based on the request.

5. The electronic device of claim 1, wherein the processor is further configured to execute the one or more instructions to release the Bluetooth connection with the Bluetooth device based on whether Bluetooth data is received from the Bluetooth device.

6. The electronic device of claim 5, wherein the processor is further configured to execute the one or more instructions to:
determine whether new Bluetooth data is received from the Bluetooth device within a certain time period from a time point when most recent Bluetooth data is received from the Bluetooth device; and
release the Bluetooth connection with the Bluetooth device based on a determination that the new Bluetooth data is not received from the Bluetooth device within the certain time period.

7. The electronic device of claim 1, wherein the processor is further configured to execute the one or more instructions to output a notification message indicating that a use of the Bluetooth device may be limited to recover the WiFi communication.

8. The electronic device of claim 7, wherein the processor is further configured to execute the one or more instructions to identify the Bluetooth device connected through Bluetooth communication, and
wherein the notification message includes identification information of the identified Bluetooth device.

9. The electronic device of claim 7, wherein the notification message includes information about a time during which the use of the Bluetooth device may be limited.

10. The electronic device of claim 1, wherein the Bluetooth device comprises at least one of a remote control, a keyboard, a mouse, a speaker, an earphone, or a headphone.

11. A method of operating an electronic device, the method comprising:
detecting that a Wireless Fidelity (WiFi) communication of a Bluetooth-WiFi combo module is to be recovered, wherein the WiFi combo module provides the WiFi communication for communicating with an external WiFi device and a Bluetooth connection; and
releasing, based on the detecting that the WiFi communication of the Bluetooth-WiFi combo module is to be recovered a Bluetooth connection with a Bluetooth device connected through the Bluetooth-WiFi combo module, and subsequently resetting the Bluetooth-WiFi combo module to recover the WiFi communication.

12. The method of claim 11, wherein the Bluetooth-WiFi combo module comprises hardware configured to support Bluetooth communication and the WiFi communication.

13. The method of claim 12, wherein the resetting comprises resetting the hardware configured to support the Bluetooth communication and the WiFi communication, based on the released Bluetooth connection.

14. The method of claim 11, further comprising:
receiving, based on the Bluetooth-WiFi combo module being reset, a request for the Bluetooth connection from the Bluetooth device; and
establishing a Bluetooth reconnection with the Bluetooth device based on the request.

15. The method of claim 11, wherein the releasing comprises releasing the Bluetooth connection with the Bluetooth device based on whether Bluetooth data is received from the Bluetooth device.

16. The method of claim 15, further comprising determining whether new Bluetooth data is received from the Bluetooth device within a certain time period from a time point when most recent Bluetooth data is received from the Bluetooth device,
wherein the releasing the Bluetooth connection with the Bluetooth device comprises releasing the Bluetooth connection with the Bluetooth device based on a determination that the new Bluetooth data is not received from the Bluetooth device within the certain time period.

17. The method of claim 11, further comprising outputting a notification message indicating that a use of the Bluetooth device may be limited to recover the WiFi communication.

18. The method of claim 17, further comprising identifying the Bluetooth device connected through Bluetooth communication,
wherein the notification message includes identification information of the identified Bluetooth device.

19. The method of claim 17, wherein the notification message includes information about a time during which the use of the Bluetooth device may be limited.

20. A non-transitory computer-readable recording medium having stored therein a program executable by at least one processor to perform the method of claim 11.

* * * * *